June 2, 1925.

E. H. THOMPSON 1,539,885

ELECTRICAL CONTROL APPARATUS

WITNESS
A. B. Wallace

INVENTOR
Euster H. Thompson
BY
Winter & Brown
ATTORNEYS

Patented June 2, 1925.

1,539,885

UNITED STATES PATENT OFFICE.

EUSTIS H. THOMPSON, OF NEW KENSINGTON, PENNSYLVANIA, ASSIGNOR, BY DIRECT AND MESNE ASSIGNMENTS, TO WESTINGHOUSE ELECTRIC & MANUFACTURING COMPANY, A CORPORATION OF PENNSYLVANIA.

ELECTRICAL CONTROL APPARATUS.

Application filed December 10, 1921. Serial No. 521,385.

*To all whom it may concern:*

Be it known that I, EUSTIS H. THOMPSON, a citizen of the United States, and a resident of New Kensington, in the county of Westmoreland and State of Pennsylvania, have invented a new and useful Improvement in Electrical Control Apparatus, of which the following is a specification.

This invention relates to an electrical control apparatus and has for an object to maintain a predetermined electrical condition in the supply line of a generator, regardless of the purpose for which said supply is used.

It is a special object of the invention to provide such a control system in which the usual magnets, switches, and auxiliary devices used in effecting the control are accelerated or speeded up under certain conditions, thus securing a highly responsive and effective control.

It is common practice in the type of control system to which this invention relates to use damping devices usually in the form of dash-pots for the purpose of preventing premature responsiveness due to oscillations or fluctuations, caused by variations due to the mechanical action of the several working parts, small variations of the main control current and variations of the auxiliary control currents or other auxiliary circuits. It has been found that such damping devices under severe conditions of operation are objectionable as at present employed because of the fact that they produce a drag or undue friction when large fluctuations in the control circuit occur, preventing a quick responsive action of the regulator. This objection is particularly noticeable when a dash-pot is used in which a heavy frictional adjustment is employed.

Another special object of the invention is to provide a system of control in which the above noted objection is overcome, that is, in which the objectionable retarding action of the damping devices used is neutralized or destroyed during abnormal variations or fluctuations in the controlled circuit.

It is also noted that the sluggishness of many known regulating systems employed in connection with electric furnaces is due in part to the inertia of controlling levers and electrodes, the friction of the controlling levers and dash-pots, and over-traveling of the electrodes.

Another object of the invention is to overcome the sluggishness due to the above causes when the invention is embodied in a furnace controlling system.

It is also an object to provide a regulating system in which there will be an automatic compensation or equalization between the several controls when a plurality of the regulators are used in connection with generators operating in parallel with each other in the same system.

It is still a further object to provide a control system having the above advantages and in which various safety devices are employed to prevent damage arising from abnormal conditions in the several devices comprising the system as a whole, so as to render the same able to overcome or withstand the difficulties arising from the most severe conditions encountered in operation.

These and other objects of the invention will more readily appear from the following description taken in connection with the appended claims.

Like reference characters are used to denote corresponding parts throughout the several views in which.

Figure 1:
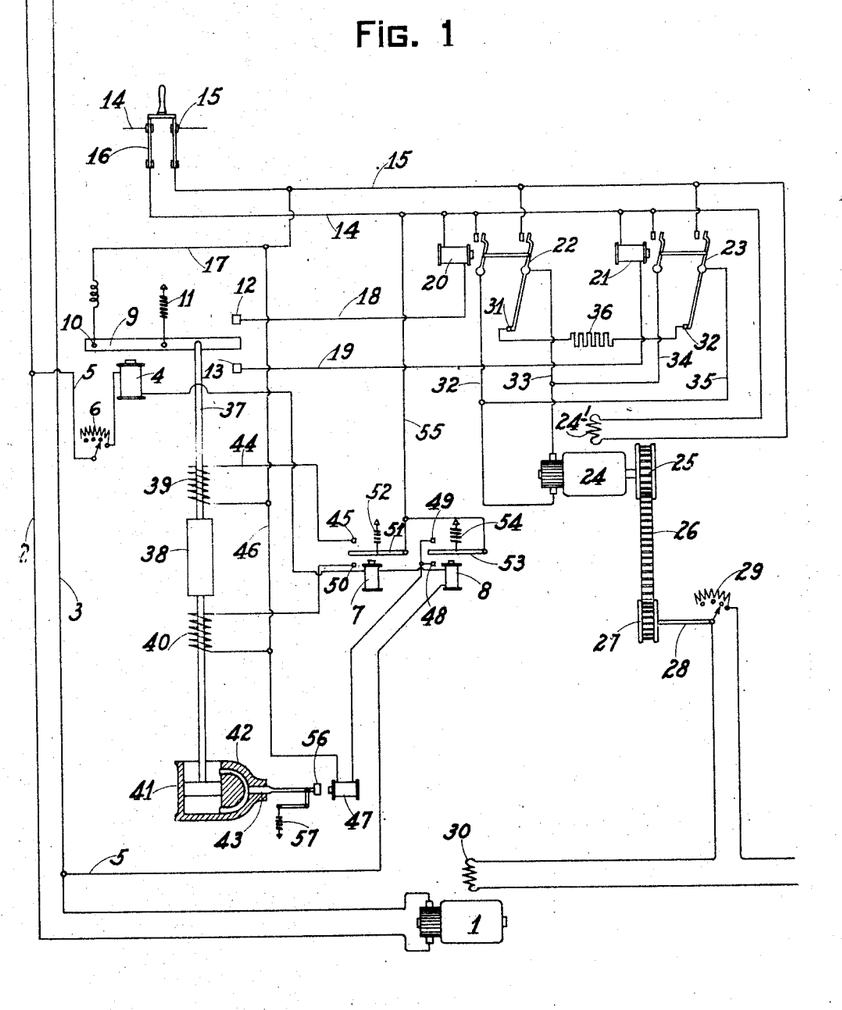
Fig. 1 is a diagrammatic view of the invention as applied to a system in which the output of the generator is maintained constant by varying the resistance in the field winding thereof.

In the embodiment of the invention shown in Fig. 1, 1 designates a generator having the leads 2, 3 in which the voltage is to be maintained substantially constant. A main controlling magnet 4 is interposed in a conductor 5 bridging the leads 2 and 3 and also interposed in this conductor is a rheostat 6 and relay magnets 7 and 8, it being obvious that a change in voltage in the leads 2 and 3 will cause a change in the current in these magnets and consequently vary their pull.

The magnet 4 influences the position of the main controlling switch 9, pivoted at 10 against the tension of spring 11. The switch arm is adapted to contact terminal 12 or 13 depending upon its direction of movement to complete a circuit between the auxiliary supply leads 14 and 15 when the switch 16 is in closed position, a conductor 17 connecting lead 15 to the switch arm 9, and the conductors 18 and 19, respectively, connecting the terminals 12 and 13 to the said auxiliary leads. Interposed in the conductors 18 and 19 are the magnets 20 and 21 for actuating the auxiliary switches 22 and 23 to close the circuit of motor 24 whose field winding is indicated at 24', said motor through the gear 25, rack 26, gear 27 and shaft 28 being adapted to move the arm of rheostat 29 in order to vary the resistance in the field winding 30 of generator 1, and consequently its voltage.

The switch 22 is connected with the motor by conductors 32 and 33 and the switch 23 is similarly connected through the conductors 34 and 35. One arm of each of the auxiliary switches 22 and 23 is prolonged and is adapted to contact the terminals 31 and 32 when in open position in order to insert a resistance 36 in a short circuit of the armature circuit of motor 24 to produce a dynamic braking effect.

Connected to the switch arm 9 by means of a rod 37 is the core 38 of magnets 39 and 40 and connected to the extremity of the core 38 is a damping device in the form of a dash-pot 41 having the usual by-pass 42 controlled by valve 43.

One end of the winding of the magnet 39 is connected by conductor 44 to a terminal 45 and its opposite end to a conductor 46 leading from line 17 through a relay 47 to a pair of terminals 48 and 49. One end of the winding of magnet 40 is connected to the terminal 50 and its opposite end to the conductor 46.

The relay 7 actuates a switch 51 against the tension of spring 52 and the relay 8 similarly actuates the switch 53 against the action of spring 54, both of said switches being connected with the auxiliary supply lead 14, by means of conductor 55.

The relay 47 is adapted to attract the armature 56 attached to the stem of valve 43, which valve tends to close under the influence of spring 57.

The relative strengths of magnet 4, relays 7 and 8, and of the springs 11, 52 and 54 are such that during the normal operation the main controlling switch 9 will be moved to contact the terminals 12 and 13 without closing switches 51 and 53, but upon a slight abnormal fluctuation the switch 51 will be closed and upon a great abnormal fluctuation the switch 53 will be closed.

In operation the generator maintains a predetermined speed and consequently predetermined voltage in the main supply leads 2 and 3, and the magnet 4 exerts a pull upon the switch arm 9 which is counterbalanced by spring 11. If the voltage in the leads 2 and 3 increases beyond a predetermined amount, magnet 4 lowers the arm 9 into contact with terminal 13 completing a circuit through conductor 15, switch 16, conductor 17, switch 9, conductor 19, magnet 21 and lead 14, thus closing auxiliary switch 23 and completing a circuit through motor 24, through conductors 15, 35, 34 back to lead 14 to cause the motor to increase the resistance in the field of generator 1. This decreases the output of the generator and the voltage in leads 2 and 3 drops correspondingly, and since the pull of magnet 4 is also decreased, spring 11 moves arm 9 out of contact with terminal 13. If the voltage should fall below that for which the control is designed the spring 11 will move arm 9 upwardly, contacting at 12, closing the circuit of the auxiliary magnet 20 through conductors 15, 17, arms 9, 18 and 14, to move auxiliary switch 22 to closed position, at which time current is caused to flow in the opposite direction through motor 24, by means of conductors 15, 33, 32 and 14, which causes resistance to be cut out of field 30 to raise the voltage of generator 1.

During normal operation, as above described, slight variations or fluctuations are prevented from influencing the action of switch 9 due to the use of the dash-pot 41, and the springs 52 and 54 hold switches 51 and 53 in their neutral position throughout the cycle of operation as set forth. Should, however, a fluctuation slightly above normal occur, relay 7 will be sufficiently energized to overcome spring 52, and move switch 51 into contact with the terminal 50 to complete a circuit through magnet 40 by means of conductors 15, 46, 55 and 14. The energization of magnet 40 therefore aids the pull exerted by magnet 4, and accelerates the movement of switch 9. Likewise should a fluctuation slightly below normal occur, switch 51 will contact 45 and energize magnet 39 through 15, 44, 55 and 14 in which case pull of magnet 39 will assist the spring 11 in accelerating the action of main switch 9.

In case of a fluctuation greatly above normal the switch 53 will be brought into play to contact terminal 48 thus also energizing relay 47, the circuit being closed therethrough by 15, 46, contact 48, switch 53, conductors 55 and 14. Energization of relay 47 attracts armature 56 to open the by-pass valve 43 of dash-pot 41, thus eliminating all retarding action necessarily incident to its use. In this case the action of switch 9 will be greatly accelerated to quickly bring the system back to its normal working condition. In case of a great abnormal fluctuation below normal, switch 53 contacts at 49 completing the circuit through 15, 46, 49, 53, 55 and 14, thus opening the by-pass of the dash-pot in the same manner as in the case of a great fluctuation above normal.

The auxiliary switches 22 and 23 are normally biased to their open position and when in such position contact with terminals 31 and 32 to short circuit the armature of the motor 24, the circuit being completed through switches 23, 35, 33, auxiliary switch 22, contact 31, resistance 36 and contact 32. This produces a dynamic braking effect upon the motor 24 to stop it very quickly whenever the auxiliary switches are opened, thus adding to the sensitiveness and accuracy of the system.

Figure 2:
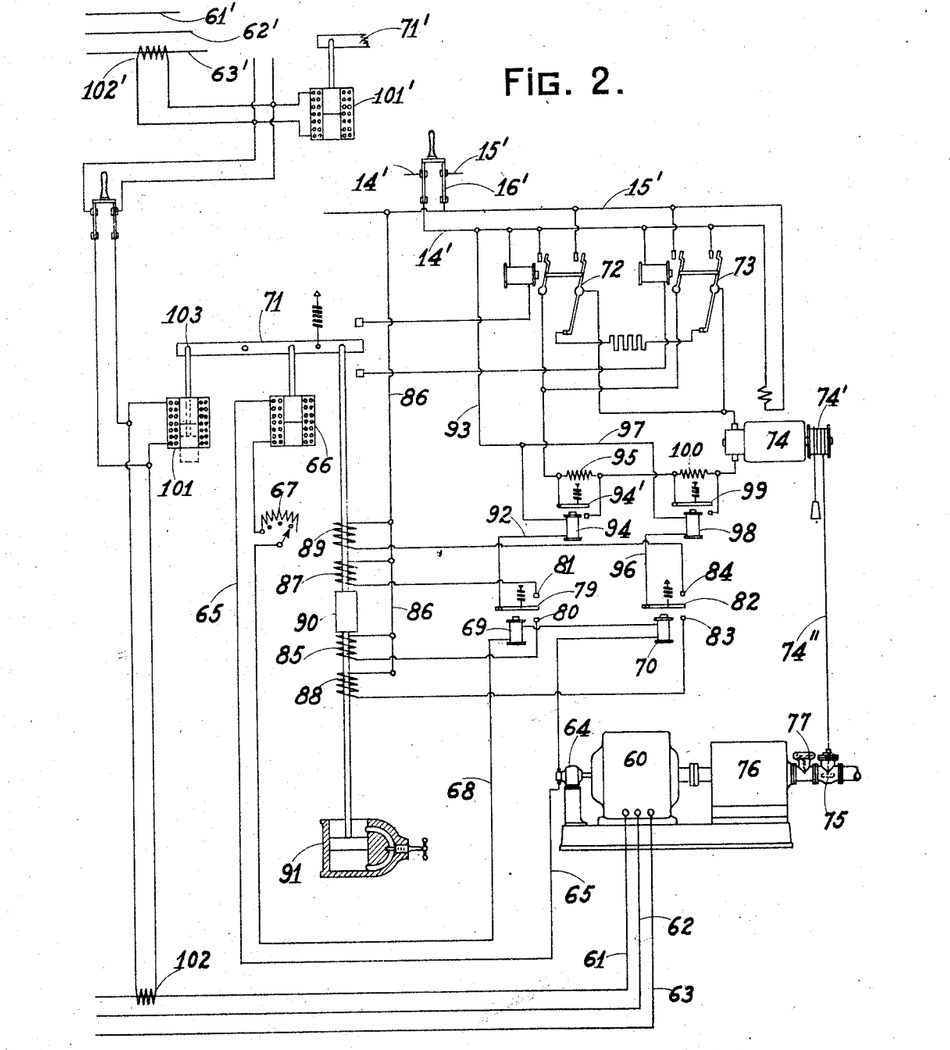
Fig. 2 a similar view illustrating the invention as applied to a generator system in which the speed of the generator is controlled through its operating motor, also illustrating how the control is employed for securing a compensation between several units when employed in a single system.

In the embodiment illustrated in Fig. 2 a generator 60 supplies current through supply leads 61, 62 and 63. Connected to the shaft of the generator 60 is the auxiliary generator 64, and since both are driven at the same speed their outputs will be in proportion to their relative capacities, th is enabling the speed of generator 60 to be controlled by variations in the output of the auxiliary generator 64.

The circuit of the generator 64 is completed through conductors 65, main control magnet 66, rheostat 67, line 68, and relays 69 and 70.

The main controlling magnet 66 controls the main switch 71, the auxiliary switches 72, 73 and motor 74 in the same manner as in the previously described embodiment, and it is therefore deemed unnecessary to repeat that portion of the description. The motor 74 however instead of changing the resistance in the field winding of the generator moves the throttle valve 75 of the turbine 76, driving the generators 60 and 64, an emergency speed governor for said turbine being indicated at 77.

The relay 69 actuates a switch 79 adapted to contact at 80 or 81 and the relay 70 likewise moves a switch 82 contacting at 83 and 84. Leading from the contact 80 is a conductor connected to one end of the winding of magnet 85, the other end of which is connected to conductor 86 leading to the auxiliary supply line 15'. The contact 81 has leading thereto one end of the winding of magnet 87, the other end being connected to 86. The windings of magnets 88 and 89 are similarly connected to the contacts 83 and 84 respectively, and to the conductor 86. Each of the magnets 85, 87, 88 and 89 is adapted to influence the core 90 attached to the main control lever 71, a dash-pot 91 being connected to said core if desired.

The switch arm 79 is connected to the lead 14' by conductors 92 and 93 in which is interposed the relay 94 adapted to actuate the switch 94' to short circuit the resistance 95 in the armature circuit of motor 74. The switch arm 82 is similarly connected to lead 14' by conductors 96, 97 and 93 through the relay 98 and controlling switch 99 for short circuiting resistance 100 also in the armature circuit of motor 74.

The compensating magnet 101 is placed in series with the secondary winding of transformer 102. The core of magnet 101 is connected at 103 to the end of the main switch arm 71. The function of the magnet 101 is to cause the speed of the generator to either rise or fall as the load or current increases, and, as illustrated, will cause the speed to rise as the current generated increases.

If several units such as shown and described are to be operated in parallel, means for compensating and equalizing the same so as to properly proportion the total load between them is necessary to prevent one unit assuming more than its proper share. A compensating magnet 101' connected in parallel with compensating magnet 101 is employed for such purpose, the magnet 101' being in series with the secondary conductor of the transformer 102' of the additional unit, the generator supply leads thereof being indicated at 61' 62' and 63', corresponding to the leads 61 to 63, and the switch lever 71' corresponding to the main switch lever 71.

The operation of this embodiment is as follows: An increase in the speed of the generator 60 increases the current in its leads 61 to 63, and since the speed of auxiliary generator 64 increases in the same ratio as the main generator the pull exerted by the controlling magnet 66 is also correspondingly increased. Should the current be increased beyond the desired amount, magnet 66 will lower main switch 71, and should it be decreased below such predetermined amount switch 71 will rise, and close one of the auxiliary switches 72 or 73.

The lowering of switch 71 and consequent closing of switch 73 actuates the main motor 74 and through the drum 74', and cable 74'' gradually closes the throttle valve 75 and reduces the speed of the turbine 76 and generator 60 sufficiently to maintain the predetermined desired speed of the generator. Should the current in the supply leads fall below the desired amount the switch 71 rises, closes auxiliary switch 72, causing motor 74 to revolve in the opposite direction, and thus open the throttle valve 75 to increase the speed of the generator.

During such normal operation relays 69 and 70 do not cause the switches 79 and 82 to be actuated, said switches remaining in their neutral positions, but as soon as a slight abnormal fluctuation in the controlling current occurs, switch 79 will contact at 80 or 81, energizing either magnet 85 or 87, as the case may be, which exerts a pull on the main switch arm 71 to accelerate its action. Contacting of switch 79, 80 or 81, also completes a circuit through relay 94 to actuate switch 94', to short circuit the resistance 95, in the armature of motor 74, and thus causes it to be speeded up. Should the fluctuation be greatly above or below normal, switch 82 will be caused to contact at 83 or 84 and thus cause magnets 88 or 89 to be energized, and also causing relay 98 to be brought into play to short circuit the additional resistance 100 in the armature circuit of motor 74 and thus speed up the actuation of the same.

From the above it is obvious that during the reverse operation the resistance 100 will be cut in before resistance 95, and thus gradually slow down the motor previously to the cutting off of its supply current from the leads 14' and 15'.

If it is desired to regulate the speed so that it will fall as the load increases, the core of magnet 101 may be placed below the coil, as indicated in dotted lines, in which case the pull of magnet 101 will supplement the pull exerted by magnet 66.

In case more than one generating unit is employed, as previously described, the switch between the compensating magnets 101 and 101' is closed, and any change in the current in one unit will then correspondingly influence the compensating magnet in the other units and cause a corresponding change in the controlling and operating devices. This assures an equal distribution of the load between the several units employed, and as many units can be used in parallel as may be desired, by simply multiplying the controlling devices described.

Figures 3, 4:
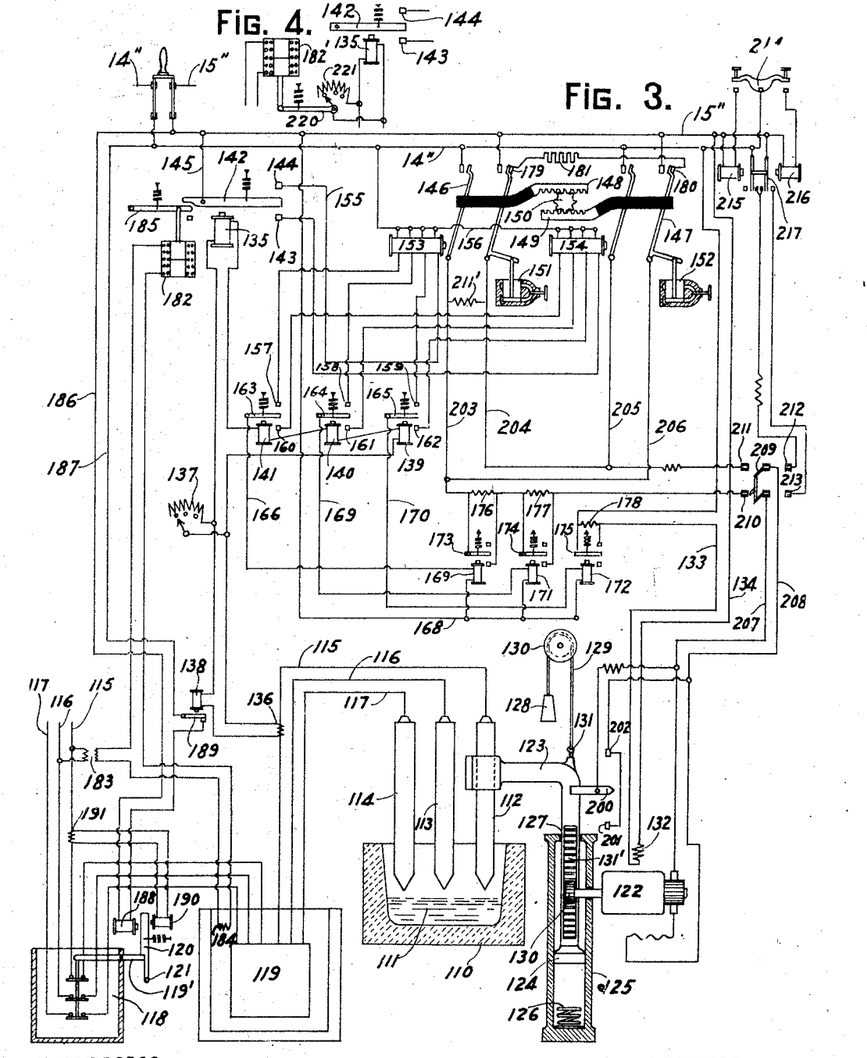
Fig. 3 a diagrammatic view illustrating the invention embodied in a control for an electric furnace.
Fig. 4 illustrates a modified form of one of the devices used in conjunction therewith.

Fig. 3 shows my invention embodied in an electric furnace which is the preferred use to which the invention is to be applied. The furnace is diagrammatically indicated as comprising the receptacle 110 containing a conductive charge 111 and having the electrodes 112, 113 and 114 between which and the charge arcs are maintained. The electrodes are respectively connected to the supply conductors 115, 116 and 117, such conductors having interposed therein a main switch 118, and transformer 119. The main switch 118 is normally held in closed position by a lever 119' and latch 120 pivoted at 121, which is adapted to release the lever 119' and allow the switch to open in a manner to be presently described.

The operating motor 122 and the accompanying control connections have been shown in connection with the electrode 112 only, but it is understood that the same arrangement may be used for each of the electrodes. The electrode is attached to a supporting arm 123 provided at its lower end with a piston 124 having a guiding cylinder 125 equipped with a bumper spring 126, the arm being vertically guided by the cooperation of the piston 124 and the fit of the arm in the upper end of the cylinder as at 127. The weight of the arm and its attached parts is counterbalanced by the weight 128 attached to the cable 129 passing over the sheave 130 and having its opposite end fastened to the arm at 131. The motor 122 is mechanically connected to the electrode by any suitable form of gearing, the drawing showing a pinion 130' on the motor shaft which meshes with a rack 131' on arm 123. The motor has a continuously excited field 132, which is connected through the conductors 133 and 134 to the auxiliary supply leads 14'' and 15''. The main controlling magnet is indicated at 135 and is in series with the secondary winding of transformer 136, and also arranged in series therewith are the rheostat 137 and the relays 139, 140 and 141. The main controlling magnet 135 is adapted to influence the main controlling switch 142 contacting at 143 and 144 and connected to lead 15'' by the conductor 145.

The auxiliary switches 146 and 147 are connected by a suitable gearing driving a pair of insulated rack bars 148 and 149 and meshing with a pinion 150 to insure simultaneous operation, and switches are provided with the steadying dash-pots 151 and 152 adapted to allow a quick action near the end of the movement of the switches in either direction as clearly shown. The switches 146 and 147 are adapted to be actuated by the respective magnets 153 and 154. Each of these magnets is equipped with four windings to vary the pull thereof under different conditions of operation. A conductor 155 leads from the contact 144 and is connected with one winding of magnet 153 and the other end of which connects with the conductor 156 attached to the lead 14''. The three other windings of 153 are also connected at one end to conductor 156, and at their opposite ends to the respective contacts 157, 158 and 159. Each of the four windings of magnet 154 is connected at one end to conductor 156 and the opposite ends are connected to the respective contacts 160, 161, 162 and 143. The relays 141, 140, and 139 actuate the respective switches 163, 164 and 165, said relays and the springs of the switches 163 to 165 being so designed as to cause the windings of the magnets 153, 154 to be successively energized.

A conductor 166 connects switch 163 to relay 167 and to conductor 168 attached to lead 15″. Switches 164 and 165 are similarly connected by conductors 169 and 170 through relays 171 and 172 to the conductor 168. The relays 167, 171 and 172 are adapted to actuate the respective switches 173, 174 and 175 to short circuit the resistances 176, 177 and 178, the resistances 176 and 177 being in the armature circuit of the motor 122, and the resistance 178 in the field thereof.

When the switches 146 and 147 are in their open position, one arm of each switch is adapted to contact at 179 and 180 in order to include a resistance 181 in the short circuit of the armature of motor 122 as in the previously described embodiments.

The compensating magnet 182 is arranged in series with the secondary winding of a transformer 183 connected across the main supply leads to the furnace and also with the resistance 184 submerged in the oil of the transformer 119. The core of magnet 182 is connected to the lever 185, the end of which is adapted to strike the short arm of the switch lever of the main controlling switch 142.

Connected to leads 15″ and 14″ are the respective conductors 186 and 187 and in series therewith are the relay 188 and switch 189. Disposed on the opposite side of latch 120 from relay 188 is the relay 190 in series with the secondary winding of transformer 191 on the supply lead 115. Mounted on the arm 123 is a contact finger 200 which is adapted to engage the limiting contacts 201 and 202 for short circuiting the armature of the motor 122 upon an extreme movement of the electrode in either direction.

During the automatic control of motor 122 current is fed from leads 14″ and 15″ through the switches 146 and 147 by means of conductors 203, 204, 205 and 206 to the conductors 207, and 208 of the armature circuit of motor 122, at which time switch 209 contacts the terminals 210 and 211, the conductors 203 and 204 being bridged by the resistance 211′. Should it be desired, as in starting up the furnace, to control the movement of the electrode by hand, switch 209 is thrown to contact the terminals 212 and 213, cutting out the automatic controlling device and substituting the manual conrol. The manual control is effected by means of the rocking of contact arm 214, connected to lead 14″ and adapted to complete the circuit through either relay 215 or 216 as desired to move the switch 217. Movement of switch 217 in one direction completes the armature circuit of the motor 122 causing it to lift the electrode, while movement of the switch 217 in the opposite direction reverses the flow in the armature circuit causing it to lower the electrode.

The operation of this embodiment is as follows: The main switch 118 being locked in closed position, as shown, the switch 209 being thrown to contact at 210 and 211, and current being supplied through auxiliary leads 14″ and 15″ the furnace is heated by current from the supply leads 115 to 117. The controlling magnet 135 exerts a pull on main controlling switch 142 in proportion to the current passing through the electrode. Whenever the current supplied increases beyond that for which the system is adjusted, the main switch will be caused to contact at 143 which completes the circuit through one of the windings of magnet 154 by means of conductor 145, switch arm 142, contact 143, magnet 154, conductors 156 and 14″, to close auxiliary switch 147. Closing of switch 147 supplies current to motor 122 through conductor 206, resistances 176 and 177, switch 209, conductors 207, 288, 205 and 14″, causing the same to lift the electrode by means of pinion 130′, rack 131′, and arm 123. As soon as the electrode is lifted sufficiently to reduce the current flowing therethrough to its normal amount, the main switch 142 is released and assumes its neutral position. In case the current falls below normal the switch 142 will rise under the influence of its spring and contact at 144 energizing one winding of the magnet 153 and causing the auxiliary switch 146 to close the supply current to motor 122 through conductor 204, switch 209, conductors 208, 207, resistances 177 and 176, conductors 203 and 14″, lowering the electrode sufficiently to restore normal current. The resistance 211′ reduces the speed of motor 122 during such action as is obviously desirable.

During the above described normal operation the relays 139 to 141, 146, 171 and 172 are not sufficiently energized to close their respective switches. Should the current, however, fluctuate abnormally, the relays 141, 140 and 139 will be sufficiently energized in the order named to move the switches 163 to 165 against the respective contacts 160 to 162, thus closing the circuit through the several windings of the magnet 154 and accelerating the action of auxiliary switch 147. Should the fluctuation be abnormally low instead of high, the switches 163 to 165 will contact at 157 to 159 and likewise energize the several windings of the magnet 153 and close the auxiliary switch 146.

Contacting of lever 163 at 160, also energizes relay 167, which moves switch 173, short circuiting the resistance 176 and speeding up the motor 122. Contact of switch 164 at 161 similarly energizes relay 171, moving switch 174 and short circuiting the resistance 177, which further increases the speed of the motor. Upon extreme fluctuations and contacting of switch 165 at 162 the relay 172 is energized to insert the resistance 178 in the field of motor 122. It is thus seen that the switches 163 and 173, 164 and 174, and 165 and 175 are actuated in unison, thus securing an acceleration of both the auxiliary switches and of the motor 122 moving the electrodes.

The above particularly describes the action of the regulator upon fluctuations above normal, but it is evident that a similar energization of the relays 167 and 171 and 172 also occurs upon fluctuations below normal due to the switches 163 to 165 contacting at 157 to 159. It is also evident that as the electrode approaches the position to restore normal current therethrough the resistances 178 and 177 and 176 will be inserted in the reverse order as above described, so as to gradually slow down the motor 122 and prevent its overrunning after the proper setting has been secured.

It is also noted that due to the special by-passes provided near the ends of the dash-pots 151 and 152 a quick action of the auxiliary switches is secured at the ends of their movement regardless of whether they are open or closed and when both switches are in open position for contacting at 179 and 180 short circuiting of the armature circuit of the motor through resistance 181 occurs.

As long as voltage is maintained in the main supply leads 115 to 117 and the oil of the transformer 119 in which the resistance 184 is submerged, is cool, the magnet 182 is energized to hold lever 185 in the position shown in the drawings. Should the voltage fall, or the oil of the transformer become heated, to an extent to greatly increase the resistance 184, the spring attached to the lever 155 will cause it to strike the short arm of switch 142 and move it into contact with terminal 143 and consequently raise the electrode.

The relay 188 is normally energized by current from the auxiliary supply leads 14″ and 15″ to hold the latch 120 in position to lock the lever 119′ into position to maintain the main switch 118 closed. In the event the current in leads 14″ and 15″ should fail, the latch 120 under the influence of its spring will release the latch and allow the main switch to open.

The relay 190 is in circuit with the secondary winding of the transformer 191 and functions as an overload release. Should the current in the main leads rise abnormally high, relay 190 will overcome the pull of relay 188 and release the latch 120 of the main switch, the switch 189 is normally closed. If for any reason the current in the main control magnet circuit should rise abnormally high, relay 138 will be energized sufficiently to open switch 189 thus cutting out the relay 188 and permitting the main switch to open.

If the electrode overtravels in either direction, so as to bring the finger 200 into contact with the terminals 201 and 202, the armature of motor 122 will be short circuited as previously described, thus preventing further travel of the electrode.

In starting up the furnace, or at any time it becomes desirable to move the electrodes by hand, all that is necessary is to throw the switch 209 to contact at 212 and 213. Rocking of member 124 to one side actuates the motor 122 to raise the electrode, while rocking to the other side reverses the rotation of the motor and lowers the electrode.

In Fig. 4 is illustrated a modified construction for raising the electrodes in case the voltage should fail in the main supply leads, the magnet 182′ corresponding to magnet 182 of Fig. 3. Its core is connected to a lever 220 which moves the arm of rheostat 221 connected in the circuit of the main controlling magnet 135. As long as the magnet 182′ is sufficiently energized to lower lever 220 against the tension of its spring, resistance 221 remains inserted in the circuit of the magnet 135, but as soon as the pull of the magnet 182 decreases sufficiently, it is de-energized and resistance is cut out of the circuit, thus increasing the pull of magnet 135 which moves switch arm 142 into contact with terminal 143, bringing into play the remaining parts of the controlling apparatus, and raising the electrode in the manner previously explained.

I claim:

1. An electric control comprising an energy supply circuit, means responsive to normal variations in an electrical condition in said circuit for maintaining such electrical condition therein substantially constant, and means responsive to abnormal variations in the energy supply circuit for varying the action of the first named means.

2. An electrical control comprising an energy supply circuit, means responsive to normal variations in an electrical condition in said circuit, a member actuated by said means to maintain the electrical condition in the circuit substantially constant, and means responsive to abnormal fluctuations therein to accelerate the actuation of said member.

3. An electric control comprising an energy supply circuit, means responsive to an electrical condition in said circuit, a member actuated by said means to maintain the electrical condition in the supply circuit substantially constant, and successively responsive to different degrees of abnormal fluctuations therein to accelerate the actuation of said member in accordance with such abnormal fluctuation.

4. An electrical control comprising an energy supply circuit, means responsive to an electrical condition in said circuit, a switch actuated by said means for controlling the circuit to a motor, means operated by said motor for maintaining the electrical condition in the supply circuit substantially constant, means responsive to abnormal fluctuations in the supply circuit for accelerating the action of said switch.

5. An electric control comprising an energy supply circuit, an electro-magnet responsive to an electrical condition in said circuit, a switch controlled by said magnet, a motor controlled by said switch, means operated by said motor for maintaining the electrical condition in the energy supply circuit substantially constant, magnetic means responsive to abnormal fluctuations in the supply circuit for aiding said electro-magnet in actuating the said switch.

6. An electric control comprising an energy supply circuit, an electro-magnet responsive to an electrical condition in said circuit, a member actuated by said magnet, controlling means adapted to maintain the electrical condition in the energy supply circuit substantially constant, operative connection between the said member and controlling means, magnetic means responsive to abnormal fluctuations in the supply circuit for varying the effective pull of the said electro-magnet upon said member.

7. An electric control comprising an energy supply circuit, an electro-magnet responsive to an electrical condition in said circuit, a switch controlled by said magnet, a motor controlled by said switch, means operated by said motor for maintaining the electrical condition in the energy supply circuit substantially constant, magnetic means responsive to abnormal increases in the supply circuit for aiding said electro-magnet, and means responsive to abnormal decreases in the supply circuit for opposing said electro-magnet.

8. An electric control comprising an energy supply circuit, an electro-magnet responsive to an electrical condition in said circuit, a main switch controlled by said magnet, a pair of auxiliary switches controlled by said main switch, a reversible motor controlled by said auxiliary switches, means operated by the motor for maintaining the electrical condition in the energy supply circuit substantially constant, and magnetic means unresponsive to slight fluctuations, but influenced by abnormally great fluctuations in the supply circuit, for accelerating the control of said motor.

9. An electric control comprising an energy supply circuit, an electro-magnet responsive to an electrical condition in said circuit, a switch controlled by said magnet, a motor controlled by said switch, means operated by said motor for maintaining the electrical condition in the energy supply circuit substantially constant, magnetic means responsive to abnormal fluctuations in the supply circuit for aiding said electro-magnet in actuating said switch, a compensating magnet also responsive to the electrical condition in the supply circuit for influencing the movement of said switch, a second compensating magnet in parallel with said first named compensating magnet responsive to the electrical condition in a second energy supply circuit, connected in parallel with said first named energy supply circuit so as to equalize the loads between the two supply circuits.

10. An apparatus for regulating electric furnaces comprising an electrode to be shifted, a power circuit for said electrode, an electric motor operatively connected to said electrode, switching means responsive to variations in the energy in the electrode circuit for controlling and reversing said motor, and means responsive to abnormal fluctuations in said electrode-circuit for accelerating the action of said switching means.

11. An apparatus for regulating electric furnaces comprising an electrode to be shifted, a power circuit for said electrode, an electric motor operatively connected to said electrode, switching means responsive to variations in the energy in the electrode circuit, for controlling and reversing said motor, means responsive to abnormal fluctuations in the said electrode circuit for progressively accelerating the action of said switching means step by step, and means for simultaneously and progressively accelerating the speed of the motor during each of said steps.

12. An apparatus for regulating electric furnaces comprising an electrode to be shifted, a power circuit for said electrode, an electric motor operatively connected to said electrode, switching means for controlling and reversing said motor, said means comprising a main switch and auxiliary switches, an electro-magnet responsive to variations in the energy in the electrode circuit for actuating said switching means, means responsive to abnormal fluctuations in the electrode circuit for accelerating the action of said auxiliary switches, and means responsive to the voltage in the electrode circuit for moving the main switch to raise the electrode in case the voltage therein falls below a predetermined point.

13. An apparatus for regulating electric furnaces comprising an electrode to be shifted, a power circuit for said electrode, a main switch and transformer therein, an electric motor operatively connected to said electrode, an auxiliary supply circuit for said motor, switching means for controlling and reversing the motor, said means comprising a main controlling switch and auxiliary switches, an electro-magnet responsive to variations in the energy in the electrode circuit for actuating said switching means, means responsive to abnormal fluctuations in the electrode circuit for accelerating the action of said auxiliary switches, means responsive to the voltage in the electrode circuit and to the temperature of said transformer to raise the electrode in case either the voltage falls or the temperature rises abnormally, and means responsive to the energy of the auxiliary supply current for opening said main switch when the voltage fails in the said auxiliary supply circuit.

14. In a regulator system, a power circuit, an electric motor for controlling said power circuit, switching means responsive to variations in the energy of the power circuit for controlling and reversing said motor, means responsive to abnormal fluctuations in the energy of the power circuit for progressively accelerating the speed of the motor, and means for progressively decelerating the speed of the motor as the energy condition of the power circuit approaches normal.

15. In a regulator system, a power circuit, an electric motor for controlling said power circuit, switching means responsive to variations in the energy of the power circuit for controlling and reversing said motor, relay operated means for varying the resistance of the motor circuit to progressively accelerate the speed of the motor upon abnormal fluctuations of the energy of the power circuit and to progressively decelerate the speed of the motor as the energy condition of the power circuit approaches normal.

16. In a regulator system, a power circuit, an electric motor for controlling said power circuit, switching means responsive to variations in the energy of the power circuit for controlling and reversing said motor, electroresponsive means for accelerating said switching means step by step upon an abnormal variation in the energy of the power circuit, and electroresponsive means for accelerating said motor step by step upon an abnormal variation in the energy of the power circuit and for decelerating said motor as the energy of the power circuit approaches normal.

17. In a regulator system, a power circuit, an electric motor for controlling said power circuit, switching means responsive to variations in the energy of the power circuit for controlling and reversing said motor, means for retarding the movement of said switching means, said means being adapted to allow a quick action of said switching means near the end of each movement thereof.

18. In a regulator system, the combination with a control electromagnet and a switch actuated thereby, of a plurality of switches adapted to be operated by said switch, each of said switches comprising a plurality of electromagnet coils being responsive to different energizations, and anti-hunting means co-operating with said system.

19. An electrical control system comprising a supply circuit, an electro-magnet responsive to an electrical condition in said circuit, a switch controlled by said magnet, a motor controlled by said switch, means operated by said motor for maintaining the electrical condition in the supply circuit substantially constant, means responsive to abnormal fluctuations in the supply circuit for accelerating the actuation of said switch, a compensating magnet responsive to the electrical condition in the supply circuit, a second supply circuit, a second compensating magnet in parallel relation to said first named compensating magnet and responsive to the electrical condition in said second supply circuit, said second supply circuit being connected in parallel relation to said first named supply circuit so as to equalize the loads between the two supply circuits.

In testimony whereof, I sign my name.

EUSTIS H. THOMPSON.

Witness:
EDWIN O. JOHNS.